United States Patent Office 3,145,187  
Patented Aug. 18, 1964

3,145,187  
POLYMER BLENDS CONSISTING ESSENTIALLY OF AN INTIMATE TERNARY FUSION BLEND OF A VINYL CHLORIDE POLYMER, A CHLORINATED OLEFIN POLYMER, AND A SURFACTANT  
Ernest H. Hankey and Ahmad Kianpour, Springfield, Mass., assignors to Monsanto Company, a corporation of Delaware  
No Drawing. Filed Mar. 10, 1960, Ser. No. 14,001  
19 Claims. (Cl. 260—23)

This invention relates to polymer blends consisting essentially of an intimate fusion blend of 88–95 parts of a vinyl chloride polymer, 12–5 parts of a chlorinated olefin polymer and 0.1–10 parts of a surfactant.

The incorporation of chlorinated olefin polymers such as chlorinated polyethylene in vinyl chloride polymers such as vinyl chloride homopolymers is known. See German Patent 1,045,089. The resulting polymer blends, as compared with the vinyl chloride polymer included therein, have higher shock resistance (measured by notched impact strength), lower tensile strength and lower rigidity (measured by flexural modulus). Two serious shortcomings are associated with the known blends of vinyl chloride polymers and chlorinated olefin polymers. If 12 weight percent or less of the chlorinated olefin polymer is included in the polymer blend, it is extremely difficult to obtain notched impact strength values significantly higher than the notched impact strength of the vinyl chloride polymer included in the blend. By way of specific illustration, when a blend of 90 weight percent of a vinyl chloride homopolymer and 10 weight percent of a chlorinated ethylene homopolymer (having a chlorine content of 40%) is milled for as long as 25 minutes on a two-roll rubber mill with the roll temperatures set at 340° F., the resulting polymer blend has a maximum notched impact strength at 25° C. (ASTM D256–54T—Method B) of less than 1 ft. lb./in. of notch. To obtain polymer blends having significantly higher notched impact strength values than the vinyl chloride polymer included therein, it is necessary to incorporate 15 weight percent or more of the chlorinated olefin polymer in the polymer blend. While at least some of such polymer blends have high notched impact strength values, their tensile strength and rigidity (measured by flexural modulus) are significantly lower than the corresponding values of the vinyl chloride polymer included in the polymer blend. The relatively low tensile strength and rigidity of such polymer blends limit the usefulness of such blends in the fabrication of many types of plastic articles such as pipe, profile extrusions, etc.

It is an object of this invention to provide polymer blends which contain therein at least 88 parts of a vinyl chloride polymer and less than 12 parts of a chlorinated olefin polymer, which polymer blends have high notched impact strengths, high tensile strengths and high flexural moduli.

Another object of this invention is to provide a method for comalaxating polymer blends containing at least 88 parts of a vinyl chloride polymer and less than 12 parts of a chlorinated olefin polymer for relatively short periods of time at moderately low temperatures to obtain intimate fusion blends of the two polymers, which polymer blends have high notched impact strengths, high tensile strengths, and high flexural moduli.

Other objects and advantages of this invention will become apparent from the following detailed descriptions thereof.

The above and related objects are attained by comalaxating a ternary mixture consisting essentially of 88–95 parts of a vinyl chloride polymer, 12–5 parts of a chlorinated olefin polymer and 0.1–10 parts of a surfactant for a short period of time at a temperature above the fusion (melting) temperature of the polymeric components. The resulting polymer blends, when properly fused and free of pigments, fillers, and/or plasticizers, will have a notched impact strength at 25° C. (ASTM D256–54T—Method B) of at least about 4 ft. lbs./in. of notch, a tensile strength of at least about 5,000 p.s.i. and a flexural modulus of at least about 280,000 p.s.i.

The following examples are set forth to illustrate more clearly the principle and practice of this invention to those skilled in the art. Where parts or quantities are mentioned, they are parts or quantities by weight.

Unless otherwise noted, all of the polymer blends subsequently reported in the examples are prepared by the following standard procedure. The vinyl chloride polymer (88–95 parts), the surfactant and 2 parts of a tin stabilizer are worked on a two-roll rubber mill until the polymer fuses and a rolling bank is formed. Thereafter, the chlorinated olefin polymer is added and the composition is worked for the period of time indicated in the examples. The roll temperatures are maintained at 340° F. throughout the mixing operation. To prepare test specimens for measurement of physical properties, sheets of the polymer blend taken from the mill are placed in a press, heated for 4 minutes at 185° C. under zero pressure and compression molded for 1 minute at 185° C. under a pressure of 4,000 p.s.i.

EXAMPLE I

A series of ternary blends are prepared which contain 90 parts of a vinyl chloride homopolymer, 10 parts of a chlorinated polyethylene polymer and, respectively, 0.1, 0.25, 0.50, 1.0, 3.0 and 5.0 parts of N,N'-bisoctadecanoyl ethylene diamine, (the symmetrical amide formed by reacting 1 mol of ethylene diamine with 2 mols of stearoyl chloride). A control blend also is prepared which contains no N,N'-bisoctadecanoyl ethylene diamine.

The vinyl chloride homopolymer included in the blends is a commercially available vinyl chloride homopolymer which has a specific viscosity of about 0.48 as measured in an 0.4% solution in cyclohexanone at 25° C. The chlorinated polyethylene included in the blends contains about 40% chlorine and, before chlorination, the polyethylene polymer has a molecular weight of about 20,000.

The blends are prepared by the standard procedure previously described and are removed from the rubber mill after 5 minutes of milling. With certain of the blends, aliquots thereof also are milled for 15 and 25 minutes. The notched impact strengths of the blends are set forth in Table I.

*Table I*

| Parts of Surfactant in Blend | Notched Impact Strength @ 25° C., ASTM D256–54T (Method B) | | |
|---|---|---|---|
| | 5 Min. Milling | 15 Min. Milling | 25 Min. Milling |
| 0 | 0.9 | 0.9 | 0.9 |
| 0.1 | 3.9 | 4.1 | 3.8 |
| 0.25 | 17.7 | | |
| 0.50 | 21.6 | 20.0 | 19.2 |
| 1.0 | 20.2 | | 21.9 |
| 3.0 | 2.1 | 22.3 | 21.5 |
| 5.0 | 1.3 | 14.0 | 17.0 |

EXAMPLE II

A series of blends identical to those of Example I are prepared except that the chlorinated polyethylene polymer included therein contains about 30% chlorine. The notched impact strengths of the blends are set forth in Table II.

Table II

| Parts of Surfactant in Blend | Notched Impact Strength @ 25° C., ASTM D256–54T (Method B) | | |
|---|---|---|---|
| | 5 Min. Milling | 15 Min. Milling | 25 Min. Milling |
| 0 | 3.1 | 3.0 | 2.8 |
| 0.1 | 18.3 | 13.4 | 8.0 |
| 0.25 | 19.2 | | 21.4 |
| 0.50 | 20.6 | 20.0 | 20.0 |
| 1.0 | 20.0 | 20.5 | 20.0 |
| 3.0 | 2.2 | 20.0 | 19.4 |

EXAMPLE III

A series of ternary blends are prepared which contain 90 parts of the vinyl chloride homopolymer described in Example I, 10 parts of the chlorinated polyethylene polymer described in Example I and 2 parts of a surfactant. The blends are prepared by the standard procedure previously described and are removed from the rubber mill after 5, 15 or 25 minutes of milling. The chemical identification of the surfactant employed, the HLB number of the surfactant, and the notched impact strengths of the blends are set forth in Table III.

Table III

| Surfactant in Blend | HLB No. of Surfactant | Notched Impact Strength @ 25° C. ASTM D256–54T (Method B) | | |
|---|---|---|---|---|
| | | 5 Min. Milling | 15 Min. Milling | 25 Min. Milling |
| Cetyl Alcohol | 1 | 13.2 | 2.7 | 2.7 |
| Stearyl Alcohol | a 1 | 16.6 | 2.6 | 2.7 |
| 12-Hydroxystearyl Alcohol | a 2 | 16.3 | 2.6 | 2.7 |
| Distearate of Butanediol-1,3 | a 1 | 17.0 | 20.4 | 2.0 |
| Sorbitan Trioleate | 1.8 | 2.6 | 19.0 | |
| Polyethylene Glycol 400 Distearate b | 4 | 14.4 | 10.8 | 18.4 |
| Polyethylene Glycol 600 Distearate b | 4 | 19.7 | | |
| Glyceryl Monostearate | 3.4 | 18.0 | 19.6 | 18.5 |
| Sorbitan Monostearate | 4.7 | 16.6 | 19.5 | 19.8 |
| Sorbitan Monopalmitate | 6.7 | 20.5 | 19.6 | 20.0 |
| Polyethylene Glycol 200 Monostearate b | a 10 | 16.7 | | 13.3 |
| Polypropylene Glycol 1,000 Monostearate b | a 10 | 3.5 | 7.5 | 19.3 |
| Stearic Acid | 1 | 13.0 | 16.0 | 15.8 |
| Sodium Stearate | 19 | 12.7 | 17.7 | 19.2 |
| Calcium Stearate | a 10 | 2.3 | 23.2 | 8.0 | a Estimated and/or calculated value.
b Number refers to molecular weight of the polyglycol.

EXAMPLE IV

Ninety-one parts of the vinyl chloride homopolymer described in Example I, 2 parts of a tin stabilizer and 2 parts of N,N'-bisoctadecanoyl ethylene diamine are admixed with 9 parts of the chlorinated polyethylene described in Example I, said chlorinated polyethylene being cut into small cubes measuring about 1" to a side. The resulting admixed material is mixed in a Baker-Perkins mixer for 30 minutes at a temperature of 260° F. Upon cooling, the product is obtained in the form of small vinyl chloride polymer particles which carry on their surface a thin coating of the chlorinated polyethylene. This composition can be extruded from conventional screw extruders at a temperature of about 375° F. to obtain a sheet having high notched impact strength.

EXAMPLE V

Ninety parts of the vinyl chloride homopolymer described in Example I, 5 parts of an interpolymer of 72 weight percent styrene and 28 weight percent acrylonitrile (specific viscosity=0.1 as measured at 25° C. in a 1% solution in dimethylformamide), 2 parts of a tin stabilizer and 2 parts of N,N'-bisoctadecanoyl ethylene diamine are worked on a two-roll rubber mill for five minutes with the roll temperature being set at 340° F. The composition is sheeted off the mill and comminuted to a size such that the entire composition passes through a 20 mesh (U.S. standard) screen.

One hundred parts of the comminuted material above described are admixed with 10 parts of the chlorinated polyethylene described in Example I, said chlorinated polyethylene being cut into small cubes measuring about 1" to the side. The resulting admixed material is mixed in a Baker-Perkins mixer for 30 minutes at a temperature of 260° F. Upon cooling, the product is obtained in the form of pellets of vinyl chloride polymer which carry on their surface a thin coating of the chlorinated polyethylene. This composition can be directly extruded or injection molded to obtain fabricated articles having high notched impact strength.

The compositions of this invention consist essentially of an intimate fusion blend of (a) 88–95 and preferably 90–93 parts of a vinyl chloride polymer, (b) 12–5 and preferably 10–7 parts of a chlorinated olefin polymer, and (c) 0.1–10 and preferably 1–5 parts of a surfactant.

The vinyl chloride polymer included in the polymer blends may be any rigid vinyl chloride polymer such as vinyl chloride homopolymers and interpolymers of vinyl chloride with interpolymerizable vinylidene monomers such as vinyl esters of monobasic organic acids containing 1–18 carbon atoms, e.g., vinyl acetate, vinyl benzoate, vinyl stearate, etc.; vinylidene chloride; acrylonitrile; methacrylonitrile; alkyl acrylate esters in which the alkyl group contains 1–18 carbon atoms, e.g., methyl acrylate, butyl acrylate, octadecyl acrylate; the corresponding alkyl methacrylate esters; dialkyl esters of dibasic organic acids in which the alkyl groups contain 2–8 carbon atoms, e.g., dibutyl fumarate, diethyl maleate, etc. In general, where vinyl chloride interpolymers are employed, they should contain at least about 80 weight percent of vinyl chloride. To obtain optimum properties in the polymer blends, the vinyl chloride polymer included therein should have a relatively high molecular weight, e.g., the polymers should have a specific viscosity of at least about 0.4 as determined in an 0.4 weight percent solution in cyclohexanone at 25° C.

The chlorinated olefin polymers included in the polymer blends may be rubbery polymers containing about 20–60 and preferably 30–50% by weight of chlorine. Such chlorinated olefin polymers can be prepared by any of the methods conventionally employed in the chlorination of olefin polymers, e.g., by chlorination of the polymer in solution or in aqueous dispersion. The polymer that is chlorinated may be a homopolymer of an alpha-olefin containing 2–8 carbon atoms such as ethylene, propylene, butene-1, isobutylene, pentene-1, octene-1, diisobutylene, etc.; interpolymers consisting solely of two or more such 2–8 carbon atom alpha-olefins; or interpolymers having polymerized therein at least about 85% by weight of one or more such 2–8 carbon atom alpha-olefin with up to about 15% by weight of one or more interpolymerizable vinylidene monomer such as styrene and its homologues including alpha-methylstyrene, ring-alkylstyrenes, ringhalostyrenes, and alpha-alkyl, ring-alkylstyrenes, ring-alkyl, ring-halostyrenes; alpha,beta-unsaturated monocarboxylic acids and derivatives thereof such as acrylic acid, methacrylic acid, alkyl acrylate esters in which the alkyl groups contain 1–8 carbon atoms, e.g., methyl acrylate, butyl acrylate, 2-ethylhexyl acrylate, dodecyl acrylate, etc., the corresponding alkyl methacrylate esters, acrylonitrile, methacrylonitrile, acrylamide and methacrylamide; vinyl chloride; vinylidene chloride; vinyl esters of monobasic organic acids containing 1–18 carbon atoms, e.g., vinyl acetate, vinyl benzoate, vinyl stearate, etc.; conjugated 1,3-dienes such as butadiene, isoprene, chloroprene and the like. Before chlorination, the olefin polymer should have a molecular weight of at least about 6,000 and preferably a molecular weight of at least about 20,000.

The surfactants included in the compositions of the invention may be of the cationic, ionic or nonionic type.

Of these three classes, the cationic and nonionic surfactants are especially preferred. As is known, surfactants are compounds which contain in their structure both a hydrophobic group (sometimes referred to as a lyophilic group) and a hydrophilic group. The hydrophobic group usually will be a hydrocarbon chain containing at least 8 and preferably at least 12 carbon atoms. The hydrophilic group usually will contain at least one oxygen, nitrogen or sulphur atom. Typical of such hydrophilic groups are hydroxyl groups, thiol groups, carboxyl groups, ester groups, acetyl groups, anhydride groups, amine groups, amide groups, sulfonamide groups, quaternary ammonia groups, salts of carboxyl groups and the like.

The surfactants including the compositions of the invention preferably will have an HLB value in the range of about 1–20. The HLB number is a semi-empirical designation that has been applied to many classes of surfactants to characterize the ratio of hydrophobic to hydrophilic properties. See "Clues to Surfactant Selection Offered by the HLB System," by W. C. Griffin, appearing in the June 1956 issue of the Official Digest of the Federation of Paint and Varnish Production Clubs. Methods for calculating the HLB number of surfactants of many different types are described by J. T. Davis at pages 426–438 of the "Second International Congress of Surface Activity," 1957, Academic Press, Inc., New York City.

Suitable anionic surfactants for use in the compositions of the invention include metal and amine salts of 8–30 carbon atom fatty acids such as calcium stearate, sodium stearate, sodium laurate, ammonium oleate, the triethanolamine salt of coconut oil fatty acids, etc.; metal and amine salts of rosin acids; metal and amine salts of alkylsulfonic acids in which the alkyl group contains 8–30 carbon atoms; metal and amine salts of sulfate esters of 8–30 carbon atom fatty alcohols; metal and amine salts of long chain alkylaryl sulfonates such as sodium dodecylbenzene sulfonate; and metal and amine salts of long chain alkyl sulfosuccinate esters such as octadecyl disodium sulfosuccinate.

Examples of cationic surfactants that may be used in the compositions of the present invention include quaternary ammonium salts containing a long chain alkyl group such as cetyl pyridinium chloride and lauryl trimethyl ammonium bromide; amines such as lauryl amine, stearyl amine, rosin amine and N-dodecyl ethylene diamine; and amides such as oleoamide, stearyl amide and N-octadecyl acetamide.

Examples of nonionic surfactants suitable for use in the compositions of this invention include esters formed between 1 mol of a polyhydric alcohol containing 2–6 hydroxyl groups and at least 1 mol of a monobasic carboxylic acid containing 8–30 carbon atoms in its structure, e.g., ethylene glycol monolaurate, glyceryl monolaurate, pentaerythritol monolaurate, sorbitan monopalmitate, sorbitan monostearate, sorbitan distearate, etc.; ethylene oxide condensates of the partial fatty acid esters of polyhydric alcohols above described; 8–30 carbon atom monohydric alcohols; ethylene oxide condensates of reactive hydrogen compounds containing 8 or more carbon atoms in their structure, i.e., the long chain fatty alcohols such as lauryl alcohol and stearyl alcohol, the long chain fatty acids such as myristic acid and stearic acid, the rosin acids, long chain alkyl mercaptans such as dodecyl mercaptan, and alkylphenols such as monylphenol. Another suitable class of nonionic surfactants consists of the compounds disclosed in U.S. 2,674,619 and U.S. 2,677,700.

For a list of additional surfactants that can be employed in the invention, see the comprehensive list of commercially available surfactants set forth by J. W. McCutcheon in the 1955 July, August, September and October issues of Soap and Chemical Specialties.

The compositions of the invention can be prepared by comalaxating ternary mixtures of the vinyl chloride polymer, the chlorinated olefin polymer and the surfactant, in the proportions previously set forth, at a temperature above the fusion (melting) temperature, e.g., 300–400° F., of the polymeric compounds on conventional plastics working equipment such as rubber mills, Banbury mixers, extruders, etc.

The mixing time required to obtain intimate fusion blends having good notched impact strengths, e.g., above 4 ft. lbs./in. of notch, depends upon such factors as: (1) the proportions of vinyl chloride polymer, chlorinated olefin polymer, and surfactant contained in the composition, (2) the type of mixing equipment employed, and (3) the temperature at which the composition is worked. The mixing time required for any particular composition in any type of mixing equipment at any temperature can be readily determined with a few routine experiments. With 2-roll rubber mills, 5–25 minutes of mixing are usually required when the roll temperatures are set at a temperature of 340° F. It is preferred practice not to comalaxate the composition for any substantial period of time beyond that required to obtain the desired physical properties.

With most of the compositions coming within the scope of the invention, the preferred method of preparation consists of first fusing an intimate physical admixture of the vinyl chloride polymer, a small quantity of a heat stabilizer and the surfactant on a 2-roll rubber mill, and then adding the chlorinated olefin polymer thereto and completing the mixing.

In an alternate embodiment of the invention, an intimate physical admixture of small vinyl chloride polymer particles, the surfactant, and small particles of the chlorinated olefin polymer are agitated and heated to a temperature above the melting point of the olefin polymer, but below the melting point of the vinyl chloride polymer. Under these conditions, the chlorinated olefin polymer melts and uniformly coats the vinyl chloride polymer particles. The resulting composition is free-flowing and can be directly extruded, injection molded or calendered into fabricated articles having excellent physical properties. In one modification of this embodiment of the invention, all of the components of the ultimate composition but the chlorinated olefin polymer are intimately blended together by working on a hot rubber mill. The resulting polymer mixture is comminuted into small particles, which are then admixed with small particles of the chlorinated olefin polymer. This mixture is then agitated and heated as previously described to melt-coat the vinyl chloride polymer particles with the chlorinated olefin polymer. This technique is particularly useful when it is desired to include fillers, pigments or minor amounts of third polymers in the ultimate blend.

With compositions containing certain surfactants, notably sodium lauryl sulfate and oxyethylated nonionic surfactants having HLB numbers greater than about 12, difficulties are sometimes encountered in preparing compositions having good physical properties by the process described in the second paragraph above. Specifically, these surfactants appear to have high lubricity at the working temperatures involved and are difficult to disperse in the vinyl chloride polymer. This difficulty can be overcome and/or ameliorated by preparing a latex of the vinyl chloride polymer, incorporating the surfactant in the latex and spray-drying the latex to obtain a finely-divided admixture of the vinyl chloride polymer and the surfactant. This admixture can then be comalaxated with the chlorinated olefin polymer. If desired, the chlorinated olefin polymer also can be incorporated in the vinyl chloride polymer latex together with the surfactant before the resulting formulated latex is spray-dried.

The properties of the compositions of the invention are dependent upon the proportions of the vinyl chloride polymer, chlorinated olefin polymer and surfactant included therein. A minimum of at least 5 parts of the chlorinated olefin polymer is required per 95 parts of the vinyl chloride polymer to obtain compositions having notched impact strengths of at least 4 ft. lbs./in. of notch. The tensile strength and rigidity of the compositions decrease as increasing proportions of the chlorinated olefin polymer are included in the compositions. For this reason, not more than about 12 parts of the chlorinated olefin polymer should be employed per 88 parts of vinyl chloride polymer.

The quantity of surfactant to be included in the compositions of the invention is best understood when considered in the light of the surfactant's probable function in the compositions. Although the precise function of the surfactant in the compositions has not been rigorously established, it is believed to alter the compatibility and/or mutual solubility characteristics of the two polymers included in the blends. In part, this belief is based upon the observed fact that the minimum quantity of any particular surfactant required to obtain high notched impact strength in a blend containing a fixed ratio of vinyl chloride polymer to chlorinated polyethylene is dependent upon the weight percent of chlorine contained in the chlorinated polyethylene. The minimum quantity of surfactant required for any given ratio of vinyl chloride polymer to chlorinated polyethylene increases as the weight percent chlorine contained in the chlorinated polyethylene increases. See the data of Tables I and II in which 0.1 part of N,N'-bisoctadecanoyl ethylene diamine is included in the blends.

The inclusion of the surfactant in the compositions of the invention in amounts above the minimum quantity required for the development of high notched impact strength has little beneficial effect upon the physical properties of the compositions, but such large quantities may lower the mixing time required for the development of good physical properties. In some compositions, the surfactant may be employed in amounts of up to 10 parts by weight per 100 parts by weight of combined vinyl chloride polymer and chlorinated olefin polymer, but it is preferred not to employ more than 5 parts of the surfactant per 100 parts of combined vinyl chloride polymer and chlorinated olefin polymer. Typically 0.1–10 and preferably 1–5 parts of surfactant are employed per 100 parts of combined vinyl chloride and chlorinated olefin polymers.

In addition to the vinyl chloride polymer, chlorinated olefin polymer and surfactant, it is preferred practice to include in the compositions of the invention heat and light stabilizers of the type conventionally employed with vinyl chloride polymers. Typical examples of such heat and light stabilizers include hydrous tribasic lead sulfate, tin mercaptides, etc. If desired, other ingredients such as fillers, dyes, pigments, lubricants, etc. may be included in the compositions of the invention.

It is frequently desirable to include small quantities of a third polymer in the blend of the vinyl chloride polymer and the chlorinated olefin polymer. Typical examples of such third polymers are interpolymers of 50–90% styrene and, correspondingly, 50–10% of acrylonitrile or methyl methacrylate, and polymethyl methacrylate. Such polymers, when employed in the amount of 2–10 and preferably 4–6 parts per 100 parts of combined vinyl chloride and chlorinated olefin polymers, improve the flow characteristics of the blends.

The products of this invention are rigid, thermoplastic compositions having higher impact strengths than the unmodified vinyl chloride polymers from which they are prepared. They also are characterized by good flow properties at relatively low processing temperatures, high heat distortion point, good chemical resistance, and good tensile strength. Examination of samples of the compositions withdrawn from a roll mix after milling times of 5, 15, and 25 minutes shows that they can withstand relatively long milling times without undergoing thermal degradation. They can be calendered, injection molded, extruded, or otherwise fabricated, usually at temperatures of about 340°–360° F., to form rigid sheets, pipes, structural pieces, tubes, rods, wire coatings, etc. When desired, they can be reinforced, e.g., with asbestos fibers.

The above descriptions and particularly the examples are set forth for purposes of illustration only. It is obvious that many variations and modifications thereof can be made without departing from the spirit and scope of the invention herein described.

What is claimed is:

1. A composition of matter having a notched impact strength at 25° C. of at least 4 ft. lbs./in. of notch (ASTM D256–54T—Method B) and consisting essentially of an intimate ternary fusion blend of (a) 88–95 parts by weight of a vinyl chloride polymer, (b) 12–5 parts by weight of an after-chlorinated product of an olefin polymer, and (c) 0.1–10 parts by weight of a surfactant; said vinyl chloride polymer being selected from the group consisting of vinyl chloride homopolymers and interpolymers having polymerized therein at least 80% by weight of vinyl chloride and up to 20% by weight of an interpolymerizable vinylidene monomer; said chlorinated olefin polymer containing about 20–60% by weight of chlorine, said olefin polymer, before chlorination, having a molecular weight of at least 6,000 and being selected from the group consisting of (1) homopolymers of a 2–8 carbon atom alpha-olefin, (2) interpolymers having polymerized therein only 2–8 carbon atom alpha-olefins and (3) interpolymers having polymerized therein at least about 85% by weight of at least one 2–8 carbon atom alpha-olefin and up to 15% by weight of an interpolymerizable vinylidene monomer; said surfactant having a HLB value in the range of about 1–20 and containing in its structure both a hydrocarbon chain containing at least 8 carbon atoms and a hydrophilic group.

2. A composition as in claim 1 in which the chlorinated olefin polymer contains about 30–50% by weight of chlorine.

3. A composition as in claim 2 in which 1–5 parts by weight of a surfactant are included in the composition.

4. A composition as in claim 3 wherein the surfactant as an ester formed between 1 mol of a polyhydric alcohol containing 2–6 hydroxyl groups and at least 1 mol of a monobasic carboxylic acid containing 8–30 carbon atoms in its structure.

5. A composition as in claim 3 in which the surfactant is N,N'-bisoctadecanoyl ethylene diamine.

6. A composition as in claim 3 in which the surfactant is sodium stearate.

7. A composition as in claim 3 in which the surfactant is cetyl alcohol.

8. A composition as in claim 3 in which the surfactant is stearic acid.

9. A composition as in claim 3 in which the surfactant is calcium stearate.

10. A composition of matter consisting essentially of (a) 88–95 parts by weight of a particulate vinyl chloride polymer and (b) 0.1–10 parts by weight of a surfactant, said vinyl chloride polymer particles having substantially uniformly coated on the surfaces thereof 12–5 parts by weight of an after-chlorinated product of an olefin polymer; said vinyl chloride polymer being selected from the group consisting of vinyl chloride homopolymers and interpolymers having polymerized therein at least 80% by weight of vinyl chloride and up to 20% by weight of an interpolymerizable vinylidene monomer; said chlorinated olefin polymer containing about 20–60% by weight of chlorine, said olefin polymer, before chlorination, having a molecular weight of at least 6,000 and being selected from the group consisting of (1) homopolymers of a 2–8 carbon atom alpha-olefin, (2) interpolymers having polymerized therein only 2–8 carbon atom alpha-olefins, and (3) interpolymers having polymerized therein at least about 85% by weight of at least one 2–8 carbon atom alpha-olefin and up to 15% by weight of an interpolymerizable vinylidene monomer; said surfactant having a HLB value in the range of about 1-20 and containing in its structure both a hydrocarbon chain containing at least 8 carbon atoms and a hydrophilic group.

11. A method for preparing a polymer composition which comprises comalaxating a ternary mixture of (a) 88–95 parts by weight of a vinyl chloride polymer, (b) 12–5 parts by weight of a chlorinated olefin polymer, and (c) 0.1–10 parts by weight of a surfactant at a temperature above the fusion temperature of the polymeric components for a period of time sufficient to obtain an intimate fusion blend thereof; said vinyl chloride polymer being selected from the group consisting of vinyl chloride homopolymers and interpolymers having polymerized therein at least 80% by weight of vinyl chloride and up to 20% by weight of an interpolymerizable vinylidene monomer; said chlorinated olefin polymer containing about 20–60% by weight of chlorine, said olefin polymer, before chlorination, having a molecular weight of at least 6,000 and being selected from the group consisting of (1) homopolymers of a 2–8 carbon atom alpha-olefin, (2) interpolymers having polymerized therein only 2–8 carbon atom alpha-olefins, and (3) interpolymers having polymerized therein at least about 85% by weight of at least one 2–8 carbon atom alpha-olefin and up to 15% by weight of an interpolymerizable vinylidene monomer; said surfactant containing in its structure both a hydrocarbon chain containing at least 8 carbon atoms and a hydrophilic group.

12. A method as in claim 11 in which the chlorinated olefin polymer contains about 30–50% by weight of chlorine.

13. A method as in claim 12 in which the surfactant is an ester formed between 1 mol of a polyhydric alcohol containing 2–6 hydroxyl groups and at least 1 mol of a monobasic carboxylic acid containing 8–30 carbon atoms in its structure.

14. A method as in claim 12 in which the surfactant is N,N'-bisoctadecanoyl ethylene diamine.

15. A method as in claim 12 in which the surfactant is sodium stearate.

16. A method as in claim 12 in which the surfactant is cetyl alcohol.

17. A method as in claim 12 in which the surfactant is stearic acid.

18. A method as in claim 12 in which the surfactant is calcium stearate.

19. A method for preparing the compositions of claim 10 which comprises (1) preparing an intimate particulate physical admixture of (a) 88–95 parts by weight of a particulate vinyl chloride polymer, (b) 12–5 parts by weight of a particulate chlorinated olefin polymer, and (c) 0.1–10 parts by weight of a surfactant, and (2) heating said particulate admixture from step 1 to a temperature above the melting point of the chlorinated olefin polymer but below the melting point of the vinyl chloride polymer while agitating said particulate admixture so as to melt the chorinated olefin polymer and uniformly coat the vinyl chloride polymer particles with the chlorinated olefin polymer; said vinyl chloride polymer being selected from the group consisting of vinyl chloride homopolymers and interpolymers having polymerized therein at least 80% by weight of vinyl chloride and up to 20% by weight of an interpolymerizable vinylidene monomer; said chlorinated olefin polymer containing about 20–60% by weight of chlorine, said olefin polymer, before chlorination, having a molecular weight of at least 6,000 and being selected from the group consisting of (1) homopolymers of a 2–8 carbon atom alpha-olefin, (2) interpolymers having polymerized therein only 2–8 carbon atom alpha-olefins and (3) interpolymers having polymerized therein at least about 85% by weight of at least one 2–8 carbon atom alpha-olefin and up to 15% by weight of an interpolymerizable vinylidene monomer; said surfactant containing in its structure both a hydrocarbon chain containing at least 8 carbon atoms and a hydrophilic group.

References Cited in the file of this patent

UNITED STATES PATENTS

| | | |
|---|---|---|
| 2,566,791 | Chaban | Sept. 4, 1951 |
| 2,592,763 | Taylor | Apr. 15, 1952 |
| 2,844,557 | Welch | July 22, 1958 |
| 3,022,263 | Orthner et al. | Feb. 20, 1962 |